(12) United States Patent
Sammon et al.

(10) Patent No.: US 8,839,379 B2
(45) Date of Patent: Sep. 16, 2014

(54) USING AN IMAGE TO PROVIDE CREDENTIALS FOR SERVICE ACCESS

(75) Inventors: Russell P. Sammon, San Francisco, CA (US); Terence Wilson, Alameda, CA (US); Rahul Ulhas Yargop, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 12/912,453

(22) Filed: Oct. 26, 2010

(65) Prior Publication Data

US 2012/0102552 A1 Apr. 26, 2012

(51) Int. Cl.
G06F 7/04 (2006.01)
G06F 15/16 (2006.01)
G06F 21/31 (2013.01)

(52) U.S. Cl.
CPC ................................. *G06F 21/31* (2013.01)
USPC ......... 726/5; 455/420; 348/207.1; 348/211.2; 382/100; 382/195

(58) Field of Classification Search
USPC ............................................................ 726/5
See application file for complete search history.

(56) References Cited

U.S. PATENT DOCUMENTS

| | | | |
|---|---|---|---|
| 6,636,973 B1 * | 10/2003 | Novoa et al. ............... 726/20 |
| 6,833,936 B1 * | 12/2004 | Seymour ...................... 358/473 |
| 2003/0200078 A1 * | 10/2003 | Luo et al. ...................... 704/2 |
| 2005/0004968 A1 * | 1/2005 | Mononen et al. ............ 709/200 |
| 2006/0206429 A1 * | 9/2006 | Martinez ....................... 705/50 |
| 2006/0208088 A1 * | 9/2006 | Sekiguchi .................. 235/472.02 |
| 2007/0229670 A1 * | 10/2007 | Soga ........................... 348/211.2 |
| 2008/0181239 A1 * | 7/2008 | Wood et al. .................. 370/401 |
| 2008/0300898 A1 * | 12/2008 | Bacha et al. ..................... 705/1 |
| 2009/0063129 A1 * | 3/2009 | Tsai et al. ......................... 704/3 |
| 2009/0142068 A1 * | 6/2009 | Takahashi et al. ........... 398/140 |
| 2009/0196456 A1 * | 8/2009 | Bisti et al. .................... 382/100 |
| 2010/0046015 A1 * | 2/2010 | Whittle et al. ................ 358/1.9 |
| 2010/0174599 A1 * | 7/2010 | Rosenblatt et al. ........ 705/14.37 |
| 2010/0241658 A1 * | 9/2010 | Rathurs et al. ............... 707/769 |
| 2011/0066421 A1 * | 3/2011 | Lee et al. ......................... 704/2 |
| 2011/0083181 A1 * | 4/2011 | Nazarov ........................ 726/23 |
| 2011/0091092 A1 * | 4/2011 | Nepomniachtchi et al. .. 382/139 |
| 2011/0096174 A1 * | 4/2011 | King et al. .................. 348/207.1 |
| 2011/0234829 A1 * | 9/2011 | Gagvani et al. ............ 348/222.1 |
| 2011/0283338 A1 * | 11/2011 | Yang et al. ....................... 726/4 |

FOREIGN PATENT DOCUMENTS

JP 2003143457 A * 5/2003 ............ H04N 5/225

* cited by examiner

Primary Examiner — Andrew Goldberg
Assistant Examiner — Gary Gracia
(74) Attorney, Agent, or Firm — Haynes and Boone, LLP

(57) ABSTRACT

A method for providing at least one credential to access a service includes receiving an image from a camera that is included in a user device that also includes a processor and a communications device. The image is analyzed using an optical character recognition engine coupled to the processor. The analyzing the image includes determining that the image includes potential credential information that includes at least one credential including at least one character string. The at least one credential from the potential credential information is provided, using the communications device, to a service in order to access the service. In an embodiment, the user device may include a limited input device that is free of a physical keyboard having alphanumeric characters, and the determination and use of the at least one credential from the image simplifies the accessing of the service by minimizing or eliminating the need to use the limited input device.

20 Claims, 7 Drawing Sheets

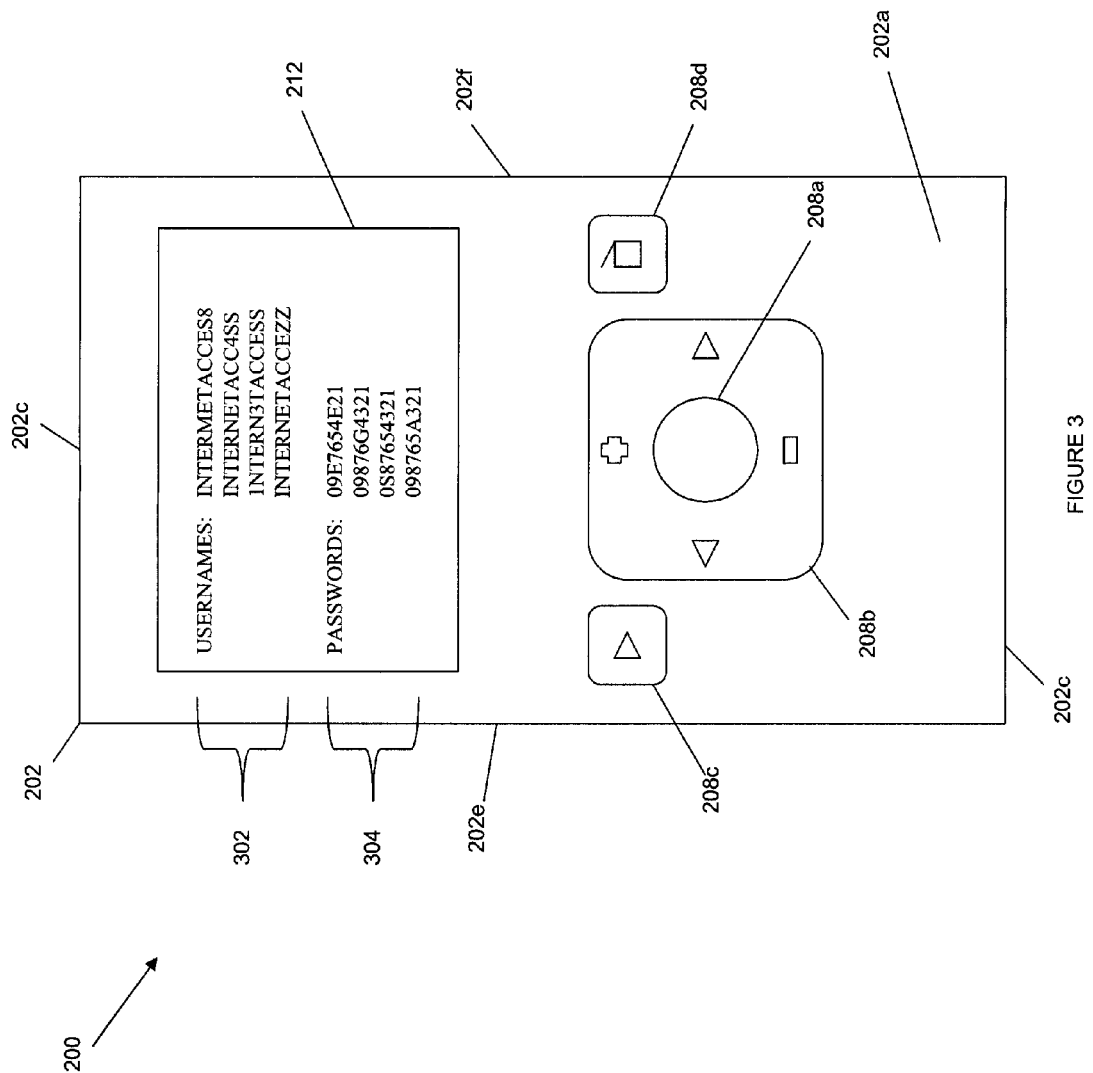

USING AN IMAGE TO PROVIDE CREDENTIALS FOR SERVICE ACCESS

TECHNICAL FIELD

The present disclosure relates generally to accessing a service, and more particularly to the use of an image to provide credentials to a service to access the Internet.

BACKGROUND

Connecting to a service such as, for example, an Internet access service through a wired or wireless local area network (LAN) is well known in the art. Typically, LANs are secured or encrypted such that users are required to provide credential information (e.g., an identifier and password) in order to connect to the Internet through the LAN. For example, an Internet access service provider may publicly post, or provide upon a payment, credential information that users may enter into a user device with which they wish to connect to the Internet. The entering of credential information into some user devices may raise a number of issues.

For example, user devices such as video recorders, cameras, cellular phones, and a variety of other user devices known in the art, may not include a physical alphanumeric keyboard. Without a physical alphanumeric keyboard, the entering of credential information into the user device may become a time intensive, error-prone process in which the user is typically required to use the limited physical input device (e.g., an input device that is free of a physical alphanumeric keyboard) on the device in order to, for example, search around a virtual alphanumeric keyboard and select the correct characters that make up the credential information. Furthermore, even with user devices that include physical alphanumeric keyboards, the credential information may be a complicated string of characters that cause the Internet access service connection process to be more time intensive and error-prone than is desirable.

Therefore, it would be desirable to provide an improved credential provision system and method.

BRIEF DESCRIPTION OF THE DRAWINGS

FIG. 2a is a front perspective view of an embodiment of a user device that may be used in the method of FIG. 1a.

FIG. 2b is a rear perspective view of an embodiment of a user device that may be used in the method of FIG. 1a.

FIG. 2c is a schematic view of an embodiment of a user device that may be used in the method of FIG. 1a.

FIG. 3 is a front view of an embodiment of a user device being that may be used in the method of FIG. 1a.

DESCRIPTION

Overview

One embodiment of the present disclosure involves a method that includes: receiving an image from a camera that is included in a system that also includes a processor and a communications device; analyzing the image using an optical character recognition engine that is coupled to the processor, wherein analyzing the image includes determining the image includes potential credential information that includes at least one credential including at least one character string; providing, to a service using the communications device, the at least one credential from the potential credential information; and accessing the service, using the system, in response to the at least one credential being accepted by the service.

One embodiment of the present disclosure involves an apparatus that includes a non-transitory, tangible computer readable storage medium storing a computer program. The computer program has instructions that when executed, carry out: receiving an image from a camera that is included in the apparatus and coupled to the non-transitory, tangible computer readable storage medium; analyzing the image and determining that the image includes potential credential information that includes at least one credential including at least one character string; providing, to a service, the at least one credential from the potential credential information; and accessing the service in response to the at least one credential being accepted by the service.

Another embodiment of the present disclosure involves a device that includes: a chassis that houses a processor; a camera housed in the chassis and coupled to the processor; a communications device housed in the chassis and coupled to the processor; and an optical character recognition engine stored on a non-transitory, tangible computer readable storage medium and operable to receive an image provided by the camera, determine that the image includes at least one credential that includes at least one character string, and provide the at least one credential to the communications device, wherein the communications device is operable to provide the at least one credential to an Internet access service in order to access the Internet.

Description of Example Embodiments

Figure 1A:
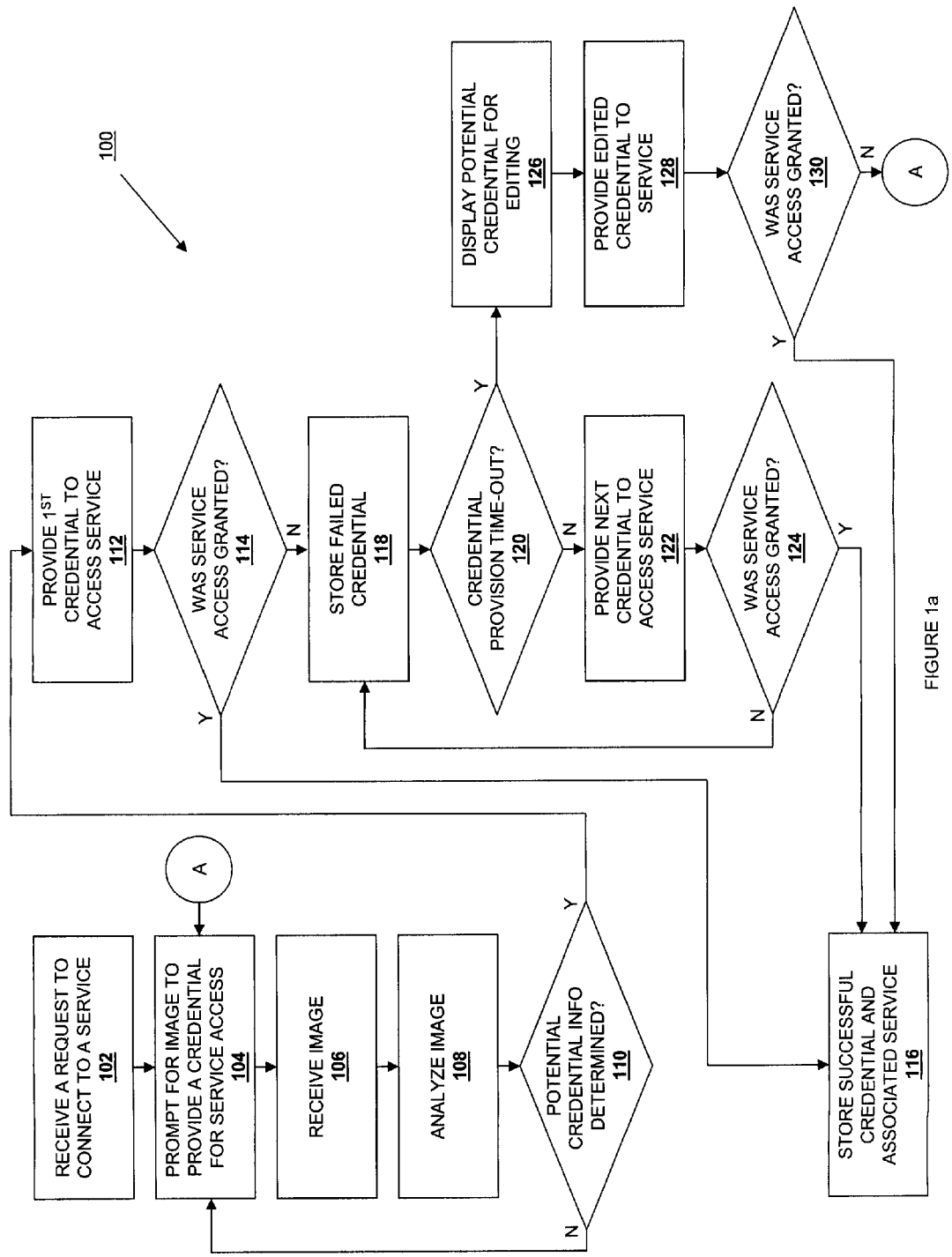
FIG. 1a is a flow chart of an embodiment of a method for providing credentials to access a service.

Referring now to FIG. 1a, in one embodiment, a method 100 for accessing a service is illustrated. In the illustrated embodiment discussed below, the method 100 allows a user device that does not include a physical alphanumeric keyboard to connect to the Internet, through an Internet access service that is secured and requires credentials, with minimal need to use a limited physical input device on the user device. Note that the method may also be valuable with a user device that includes such a keyboard, such as for easier access to the Internet. The user may capture at least one image using a camera on the user device, and that image is analyzed (e.g., using optical character recognition) to determine potential credential information. The user device then attempts to access the Internet through the Internet access service by providing credentials from the potential credential information to the Internet access service until access is granted, which minimizes or even eliminates the need to use the limited physical input device on the user device. While in the embodiment of the method 100 described below the service is an Internet access service, one of skill in the art will recognize that the method 100 may be used to access a resource (e.g., printers, video conferencing, file sharing), provide network configurations, provide a username and password to a website, provide credential information to a website, provide a website address to a web browser, provide a phone number to a phone, provide a street address to a location application, and/or a variety of other applications known in the art without departing from the scope of the present disclosure.

The method 100 begins at block 102 where a request to connect to a service is received. In an embodiment, a user has a user device that is operable to access the Internet over a network. The user device may include one or more limited physical input devices that are free of a physical alphanumeric keyboard. In an embodiment, the user device may be any device that is operable to capture an image such as, for example, a digital camera, a video camera, a cellular phone, a mobile computer, and/or a variety of other image-capturing user devices known in the art. For example, the user device may be a video camera device and the only physical input devices on the user device may be a directional button, a record button, a playback button, and a delete button. The user may operate the user device (e.g., using the input devices and/or the display) to request to connect to an Internet access service. In another example, the user device may detect that an Internet access service is available or being provided by an Internet access provider. The Internet access provider may be a business (e.g., a coffee shop, restaurant, bookstore, airport, hotel, etc.) that provides Internet access (e.g., over a Wi-Fi network) to customers, either for free or for a fee.

In order to access the Internet, the user may be required to provide credentials to the Internet access provider through the user device. In an embodiment, the Internet access provider may post a sign in their establishment that includes the credentials needed to access the Internet, or the Internet access provider may provide individual users with a printout of the credentials. In an embodiment, the sign may be displayed on a computer display.

Figure 1B:
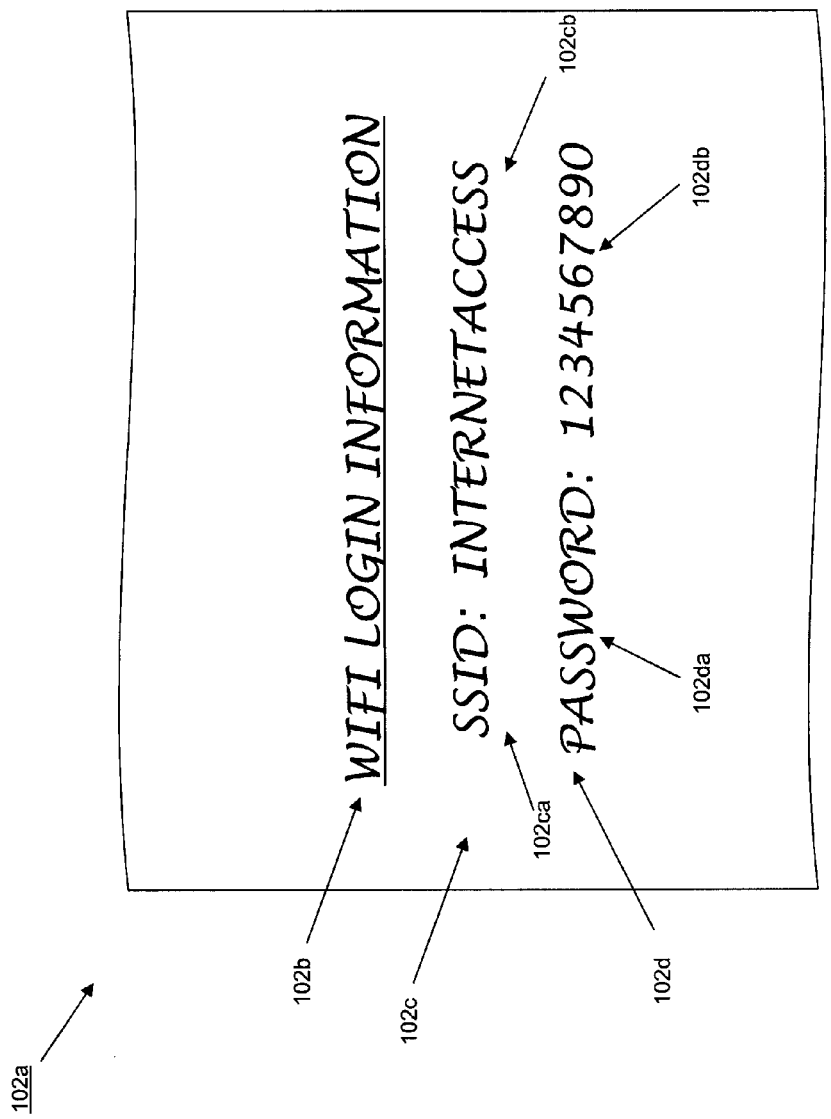
FIG. 1b is a front view of an embodiment of a sign providing credentials.
Figure 1C:
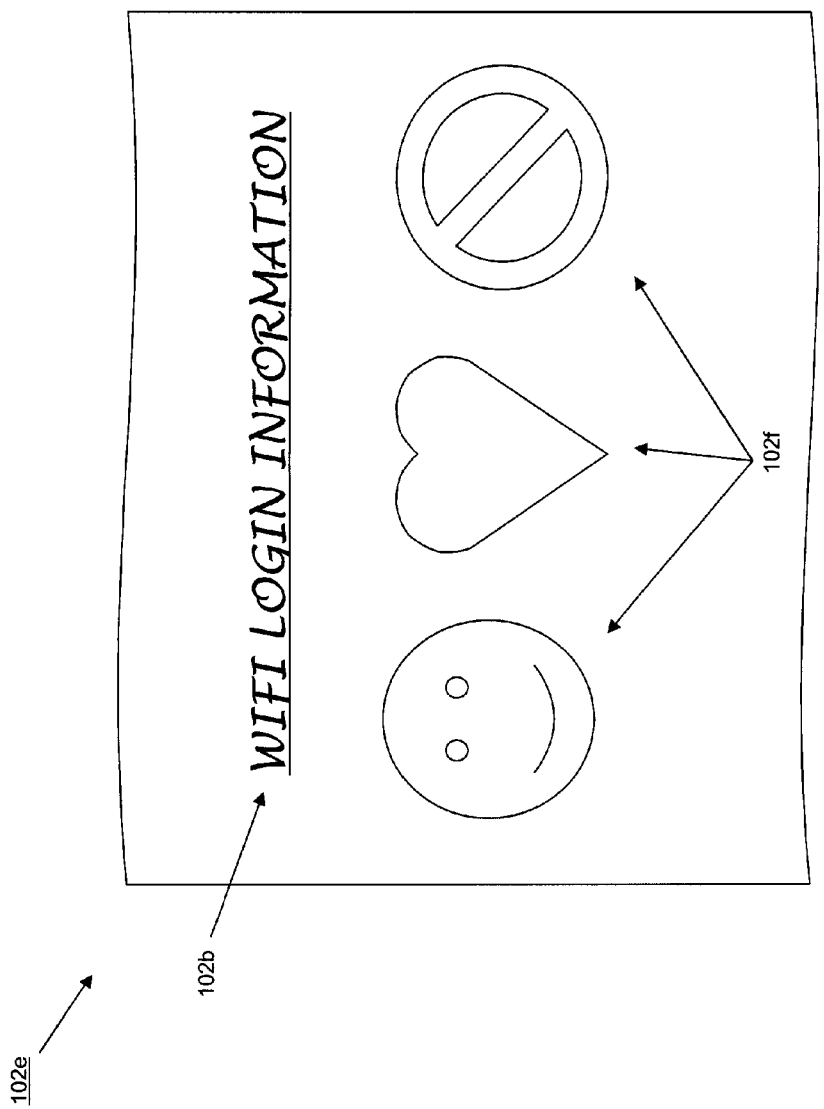
FIG. 1c is a front view of an embodiment of a sign providing credentials.

FIG. 1b illustrates an embodiment of a sign 102a that may be posted in a business establishment (or provided separately to individual users) to inform users of the credentials needed to access the Internet. The sign 102a includes an information section 102b (e.g., "WIFI LOGIN INFORMATION" in the illustrated embodiment), a primary credential section 102c (e.g., "SSID: INTERNETACCESS" in the illustrated embodiment), and a secondary credential section 102d (e.g., "PASSWORD: 1234567890" in the illustrated embodiment.) The primary credential section 102c may be split into a descriptive portion 102ca (e.g., "SSID:" in the illustrated embodiment) and a functional portion 102cb (e.g., "INTERNETACCESS" in the illustrated embodiment.) Similarly, the secondary credential section 102d may be split into a descriptive portion 102da (e.g., "PASSWORD:" in the illustrated embodiment) and a functional portion 102db (e.g., "1234567890" in the illustrated embodiment.) FIG. 1c illustrates another embodiment of a sign 102e that may be posted in a business establishment (or provided to individual users) to inform users of the credentials needed to access the Internet. The sign 102e also includes the information section 102b of sign 102a, but in place of the primary credential section 102c and the secondary credential section 102d are one or more drawings, shapes, pictures and/or other non-alphanumeric credentials 102f. In an embodiment, the non-alphanumeric credentials 102f may be a picture or photo of a person or object.

Referring back to FIG. 1a, the method 100 then proceeds to blocks 104 and 106 where an image to provide a credential for service access is prompted for and received. The user device may, for example, prompt the user to capture one or more images (e.g., using a camera on the user device) of any posted or provided credential(s) (e.g., the signs 102a or 102e) in the area in which the service provision was detected in block 102 of the method 100. The user may then use the camera on the user device to provide the image with the credential(s) to the user device. In an embodiment, a plurality of images or a video of the posted or provided credential(s) may be captured by the user and provided to the user device. The user device may use image stabilization techniques or delay capturing the image until the user device is steady in order to ensure that the quality of the image is sufficient to allow the method 100 to be performed accurately. In another embodiment, blocks 102 and 104 of the method 100 may be skipped, and the user may capture one or more images or a video (e.g., using a camera on the user device) of any posted or provided credential(s) (e.g., the sign 102a or 102e) for a service that the user wishes to gain access to. In another embodiment, rather than capturing one or more images or video of posted or provided credentials, the user may capture an image of a person or object (e.g., a person who controls the service or an object chosen by a person who controls the service.)

The method 100 then proceeds to block 108 where the image is analyzed. In an embodiment, the user device may include an image recognition engine that may be a computer program that is stored on a non-transitory, tangible computer-readable storage medium and that includes instruction that, when executed, are operable to analyze and recognize images. For example, the image recognition engine may include an optical character recognition engine that is operable to perform optical character recognition techniques known in the art. In an embodiment, the user has used the camera on the user device to take one or more images or a video of the sign 102a, described above with reference to FIG. 1b, and the optical character recognition engine is operable to recognize the alphanumeric characters in the information section 102b, the primary credential section 102c, and the secondary credential section 102d of the sign 102a. Furthermore, the optical character recognition engine may be operable to parse the recognized characters to identify key phrases based on common character layouts, expected character strings, expected character string lengths, and/or a variety of other credential provision information known in the art. For example, the optical character recognition engine may be operable to recognize the descriptive portions 102ca and 102da of the primary credential section 102c and the secondary credential section 102d, respectively, as including characters that typically proceed credentials for service access (e.g., "SSID", "PASSWORD", "NETWORK NAME", etc.). The operation may indicate to the optical character recognition engine that the functional portions 102cb and 102db of the primary credential section 102c and the secondary credential section 102d, respectively, include the characters that make up the credentials for service access. In an embodiment, the optical character recognition engine is operable to recognize characters from a variety of different languages. In another embodiment, the image recognition engine is operable to recognize the non-alphanumeric credentials 102f of the sign 102e, or may be operable to recognize the image of a person or object. In an embodiment, the optical character recognition engine may use a plurality of images or a video received at block 106 of the method 100 to more accurately determine potential credential information to access the service. In another embodiment, the image taken (e.g., the image of the sign 102a or 102e) may be displayed on the display 212 and the user may use one or more limited physical input devices on the user device to select the character string that the user wishes to be provided to access the service.

The method 100 then proceeds to decision block 110, where it is determined whether potential credential information has been determined. In an embodiment, the analyzing of the image in block 108 may not result in any potential credential information (e.g., a recognized character or character string that is sufficient to satisfy the requirements for access to the service, a recognized non-alphanumeric credential, etc.) and the method 100 then returns back to block 104 where an image to provide a credential for service access is prompted for. In another embodiment, the analyzing of the image in block 108 of the method 100 may result in potential credential information (e.g., one or more recognized characters or character strings that are sufficient to satisfy the requirements for access to the service, a recognized non-alphanumeric credential, etc.). In this case, the method 100 then proceeds to block 112 where a first credential is provided to attempt to access the service, and then to decision block 114 where it is determined whether service access was granted.

In an embodiment, the first credential provided to access the service in block 112 may be a credential determined from the sign 102*a*, described above. For example, the image recognition engine may determine, from the analysis of block 108, that the character string "INTERNETACCESS" should be provided in a first credentials entry field for the service, and the character string "1234567890" should be provided in a second credentials entry field for the service. Those credentials are then sent to the service. The method 100 then proceeds to decision block 114 to determine whether the first credential provided in block 112 resulted in access to the service. In the example given above, the character strings "INTERNETACCESS" and "1234567890" are the correct character strings for the Service Set Identifier (SSID) and password credentials, respectively, to access the Internet through the Internet access provider and, as such, the user is then allowed to connect to the Internet through the user device. In an embodiment, upon connecting to the service, an agreement (e.g., an End User License Agreement (EULA)) may be displayed on a display on the user device, and the user may use one or more limited physical input devices on the user device to accept the agreement. In another embodiment, the first credential is the non-alphanumeric credentials 102*f* which may result in access to the service. In another embodiment, the first credential may be an image of a person or object that allows access to the service (e.g., an image of a person that controls a service may be used to access the service, or an image of a person may allow a user to sync up or pair their mobile device with a mobile device of the person whose image is provided as the first credential.) The method 100 then proceeds to block 116 where the successful credentials and service are associated and stored. In an embodiment, the user device associates the character strings "INTERNETACCESS" and "1234567890" with the service detected in block 102 of the method 100 and stores the character strings to be used the next time access to the service is desired.

In another embodiment, the first credential provided to access the service in block 112 of the method 100 may be a credential determined from the sign 102*a*, described above. However, the image recognition engine may incorrectly determine that the character string "INTERM3TACC3SS" should be provided in a first credentials entry field for the service, and the character string "12E456A890" should be provided in a second credentials entry field for the service. This may result from a poor quality image received in block 106, an error recognizing the characters in block 108, and/or a variety of other optical character recognition errors known in the art. When those credentials are then sent to the service for access, access to the service will not be granted. In an embodiment, the incorrect credentials (e.g., "INTERM3TACC3SS" and "12E456A890") may be slightly modified one or more times (e.g., "INTERMETACCESS" or "INTERN3TACC3SS", or other permutations may be substituted for "INTERM3TACC3SS", and "123456A890" or "12E4567890", or other permutations may be substituted for "12E456A890") to see if they result in service being granted.

In the event service access is not granted at decision block 114, the method 100 may then begin a loop where a plurality of different credentials are provided to attempt to gain access to the service. For example, following service access not being granted in decision block 114, the method 100 proceeds to block 118 where the failed credentials are stored. In an embodiment, the failed credentials (e.g., "INTERM3TACC3SS" and "12E456A890" and/or other failed permutations) may be associated with the service and stored with any other failed credentials associated with that service in the user device. The method 100 then proceeds to decision block 120 to determine if the credential provision has timed out. In an embodiment, the credential provision times out after a predetermined number of credentials have been provided to the service and failed to result in service access. In an embodiment, the credential provision times out after a predetermined amount of time.

If the credential provision has not timed out at decision block 120, the method 100 proceeds to block 122 where the next credential is provided to access the service. In an embodiment, the user device may then provide a next credential, which is different from the failed credentials associated with the service and stored in the user device, to the service. In an embodiment, the next credential may have been determined in block 108 of the method 100. In an embodiment, the optical character recognition engine may perform optical character recognition techniques on the image received in block 106 of the method 100 after service access is not granted in decision block 114. These techniques may utilize the failed credentials associated with the service and stored in the user device in order to increase the character recognition accuracy. The method 100 then proceeds to decision block 124 where it is determined whether access to the service was granted. If access to the service is granted, the method 100 proceeds to block 116, and the successful credentials are associated with the service and stored in the user device, as described above. If access to the service is not granted, the method 100 proceeds to block 118 where the failed credentials are stored, as described above. As can be seen, the method 100 will loop through blocks 118, 120, 122, and 124 until either access to the service is granted, or the credential provision has timed out.

If, at decision block 120, the credential provision has timed out, the method 100 proceeds to block 126 where the potential credentials are displayed for editing. In an embodiment, the user device includes a display, and in the event the credential provision times out without access to the service being granted, the user device may display one or more of the credentials (e.g., credentials determined at block 108 of the method 100) to the user. Failed credentials discovered during the method 100 will not be displayed, and the credentials displayed for editing may be made more accurate based on removal of these failed credentials. The user may then select any of the one or more of the credentials for editing and use one or more limited physical input devices on the user device to change the incorrect characters in the character strings of the selected credentials so that edited credentials are provided to the user device that match the credentials posted or provided (e.g., on the signs 102*a* or 102*e*). The method 100 then proceeds to block 128 where the edited credentials are provided to the service. The user device then provides the edited credentials received in block 126 to the service, and the method 100 then proceeds to decision block 130 where it is determined whether access to the service was granted. If access to the service is granted, the method 100 proceeds to block 116, and the successful credentials are associated with the service and stored in the user device, as described above. If access to the service is not granted, the method 100 then returns back to block 104 where an image to provide a credential for service access is prompted for.

Figure 2A:
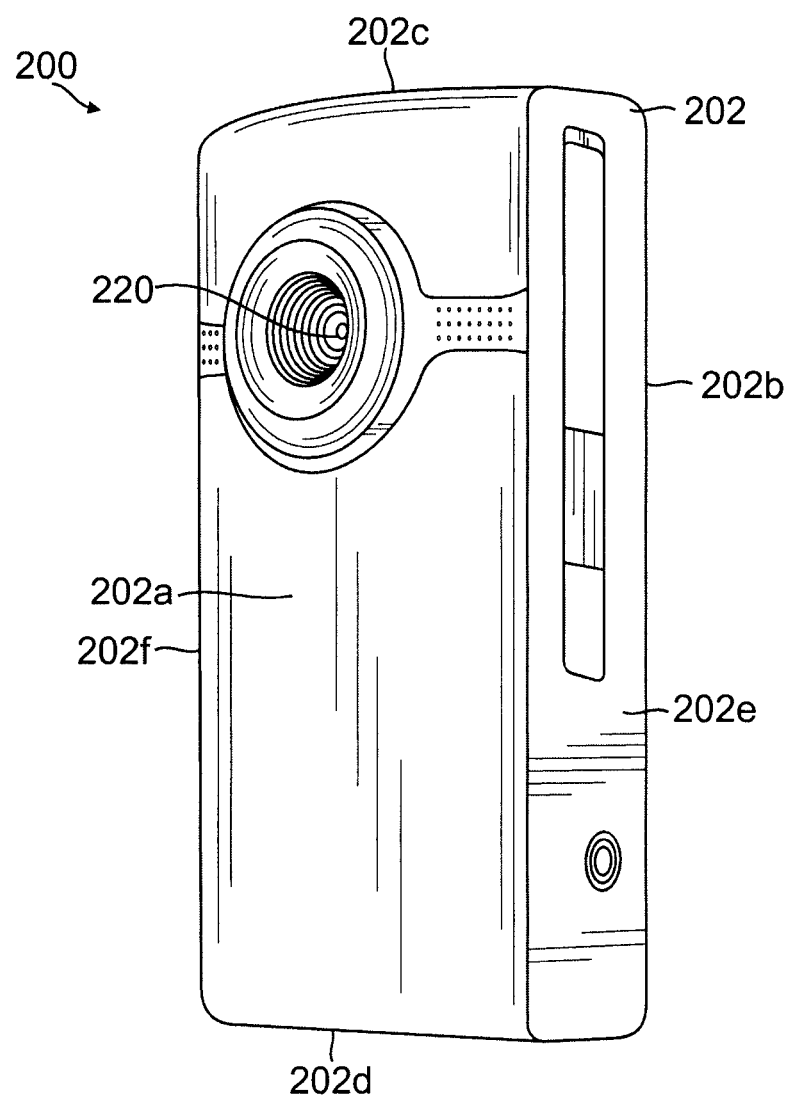
Figure 2B:
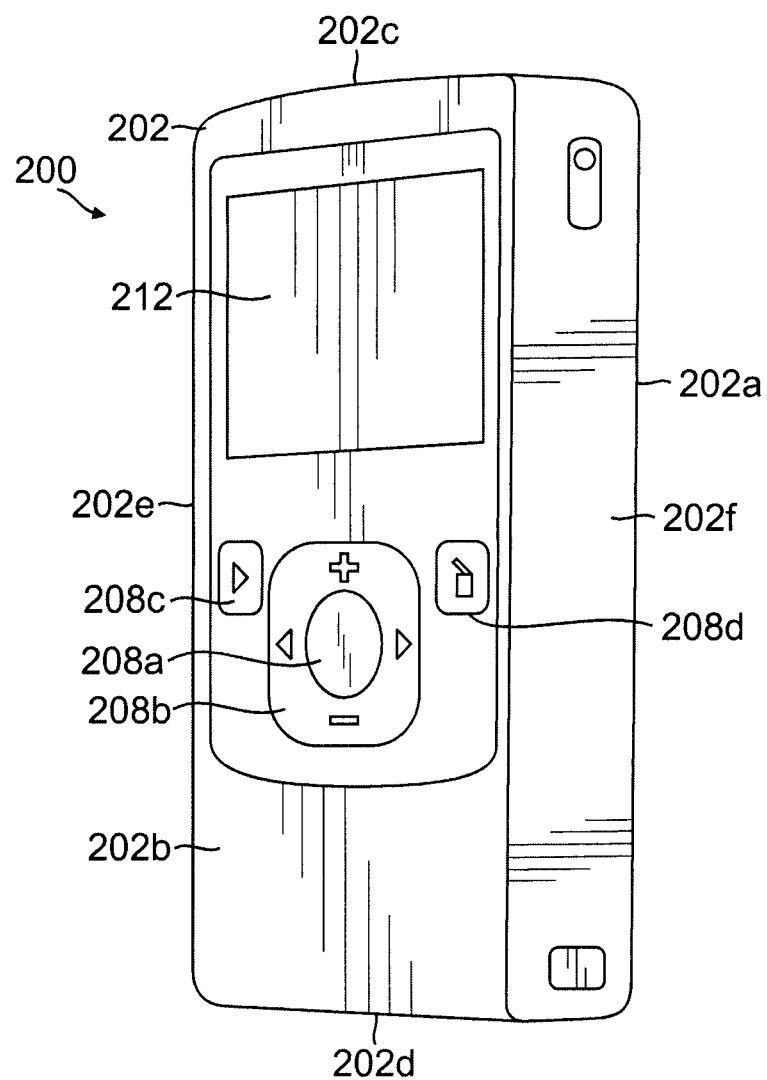
Figure 2C:
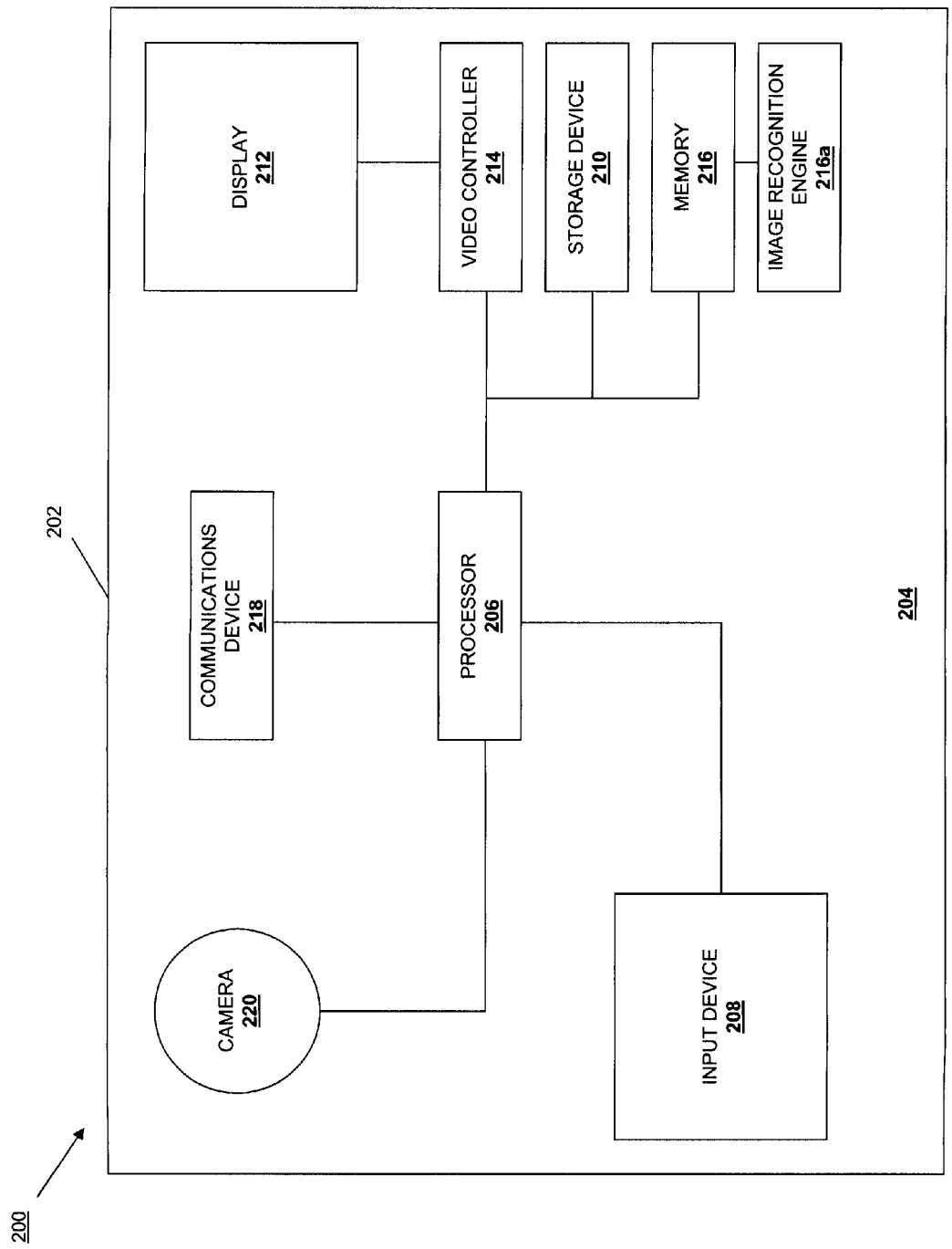

Referring now to FIGS. 2*a*, 2*b*, and 2*c*, an embodiment of a user device 200, which may be the user device described above with reference to the method 100, is illustrated. In the embodiment illustrated, the user device 200 is a video camera with a limited physical input device that is free of an alphanumeric keyboard. For example, the user device 200 may be a Flip Video camera available from Cisco Systems, Inc. However, one of skill in the art will recognize that the method 100, described above, may be performed on a variety of different user devices (e.g., a cellular phone, a laptop computer, etc) without departing from the scope of the present disclosure. The user device 200 includes a chassis 202 having a front surface 202a, a rear surface 202b located opposite the chassis from the front surface 202a, a top surface 202c extending between the front surface 202a and the rear surface 202b, a bottom surface 202d located opposite the chassis 202 from the top surface 202c and extending between the front surface 202a and the rear surface 202b, and a pair of opposing side surfaces 202e and 202f that extend between the front surface 202a, the rear surface 202b, the top surface 202c, and the bottom surface 202d. A housing 204 is defined by the chassis 202 between the front surface 202a, the rear surface 202b, the top surface 202c, the bottom surface 202d, and the side surfaces 202e and 202f.

The user device 200 includes a processor 206, which is located in the housing. An input device 208 is located in the housing 204 and coupled to processor 206 to provide input to processor 206. Examples of input devices may include keyboards, touchscreens, pointing devices such as mouses, trackballs, and trackpads, and/or a variety of other input devices known in the art. In the illustrated embodiment, the input device 208 is a limited physical input device that is free of an alphanumeric keyboard but includes a plurality of input buttons such as, for example, a record button 208a, a directional button 208b, a play button 208c, and a delete button 208d, all located adjacent the rear surface 202b of the chassis 202. Programs and data may be stored on a storage device 210, which is located in the housing 204 and coupled to processor 206. Examples of storage devices may include hard discs, optical disks, magneto-optical discs, solid-state storage devices, and/or a variety other storage devices known in the art. A display 212 is located in the housing 204 adjacent the rear surface 202b and coupled to the processor 206 by a video controller 214.

A memory 216 is located in the housing 204 and coupled to the processor 206 to provide the processor 206 with fast storage to facilitate execution of computer programs by the processor 206. Examples of memory may include random access memory (RAM) devices such as dynamic RAM (DRAM), synchronous DRAM (SDRAM), solid state memory devices, and/or a variety of other memory devices known in the art. In an embodiment, the memory 216 is a non-transitory, tangible, computer-readable storage medium and includes an image recognition engine 216a. A communications device 218 is located in the housing 204 and coupled to the processor 206 in order to provide communication between the user device 200 and a network or another device. A camera 220 is located in the housing 204 adjacent the front surface 202a of the chassis 202 and coupled to the processor 206 in order to capture images and/or video and provide the images and/or video to the user device 200. It should be understood that other buses and intermediate circuits can be deployed between the components described above and processor 206 to facilitate interconnection between the components and the processor 206.

One of skill in the art will recognize how the user device 200 may perform the method 100 described above. For example, at block 102, the processor 206 and the communications device 218 may be used to detect that the service is available and/or connect to an available service in response to a user request. At block 104, the processor 206 and the display 212 may be used to prompt a user to provide an image that includes credential information. At block 108, the processor 206 and the image recognition engine 216a may be used to analyze the image. At block 118, the processor 206 and the storage device 210 or the memory 216 may be used to store the failed credentials. At block 116, the processor 206 and the storage device 210 or the memory 216 may be used to associate and store the successful credentials and the service. At block 126, the processor 206 and the display 212 may be used to display the potential credentials for editing. For example, as illustrated in FIG. 3, at block 126, the plurality of credentials displayed may include a plurality of primary credentials 302 and a plurality of secondary credentials 304. The user may use the directional button 208b to select the credential that is displayed in each of the plurality of primary credentials 302 and a plurality of secondary credentials 304 and that the user wishes to edit. The user then may use any combination of the record button 208a, the directional button 208b, the play button 208c, and the delete button 208d in order to edit those credentials to include the appropriate character string to access the service.

Thus, a system and method have been described that allow the provision of credentials to access a service simply by providing an image of the credentials to a user device through a camera that is included on the user device. The system and method provide benefits over many user devices, including user devices with limited physical input devices that are free of an alphanumeric keyboard, as the system and method minimize or eliminate the need for the user to use the limited physical input devices in order to provide the credentials to the service.

As discussed above, the method 100 may be used in a variety of other situations without falling outside the scope of the present disclosure. For example, the image or video taken may be of a credit card, and the method 100 may use the imagine recognition engine to determine the numbers that make up the credit card number in order to provide the credit card number to, for example, a merchant, using the user device. In another embodiment, the image may include a time or data limit on the users network access, and the image recognition engine may send that time or data limit to the user device, which in turn will inform the user how far along the user's network session is in relationship to the time or data limit. In an embodiment, the image may be a video and that video may include audio. The image recognition engine may include an audio recognition engine, and the audio recognition engine may analyze audio of the SSID and password being spoken, determine character strings from the analyzed audio, and provide those character strings to access the service. In another embodiment, the image recognition engine may analyze video of the SSID and password being spoken or signed using sign language, determine character strings from the analyzed video, and provide those character strings to access the service.

The foregoing has outlined features of several embodiments so that those skilled in the art may better understand the detailed description that follows. The specific examples of components and arrangements described above are merely examples and are not intended to be limiting. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

From the foregoing discussions, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method, comprising:
   detecting, by a user device, a network access service;
   receiving an image by the user device from a camera that is included in the user device, wherein the image received from the camera includes a display of alphanumeric characters including a network name character string and a password character string, and wherein the display of alphanumeric characters are provided by a network access provider that is unaffiliated with the user device;
   analyzing the image, by the user device using an optical character recognition engine, wherein the analyzing the image includes recognizing the network name character string and the password character string in the display of alphanumeric characters that are provided in the image as potential credential information;
   determining, by the user device, that at least one first character string that includes at least one of the network name character string and the password character string of the potential credential information was not accepted by the network access service;
   automatically modifying, by the user device, the at least one first character string to produce at least one second character string that is different from the at least one first character string, wherein the at least one second character string is determined by modifying at least one character in the at least one first character string that was determined using the optical character recognition engine;
   providing, by the user device to the network access service using the at least one second character string; and
   accessing, by the user device, a network in response to the at least one second character string being accepted by the network access service.

2. The method of claim 1, further comprising:
   prompting, through a display on the user device, for the image that includes the display of alphanumeric characters including the potential credential information.

3. The method of claim 1, wherein the network access service comprises an Internet access service.

4. The method of claim 1, wherein the potential credential information also includes a first descriptive character string portion adjacent the network name character string and a second descriptive character string portion adjacent the password character string.

5. The method of claim 4, further comprising:
   determining, by the user device, that the network name character string is a first functional character string portion associated with the first descriptive character string portion and the password character string is a second functional character string portion associated with the second descriptive character string portion; and
   providing, by the user device, the network name character string and the password character string to the network access service without providing the first descriptive character string portion and the second descriptive character string portion to the network access service.

6. The method of claim 1, wherein the at least one first character string is a single first character string, the at least one second character string is a single second character string, the method further comprising:
   automatically modifying, by the user device, the single first character string to produce an modified password intermediate character string; and
   automatically modifying, by the user device, the intermediate character string a plurality of times to produce the single second character string.

7. The method of claim 6, further comprising:
   storing, by the user device, the at least one second character string in the user device.

8. The method of claim 1, further comprising:
   associating, by the user device with the network access service, each at least one second character string that was accepted by the network access service; and
   storing, by the user device, each at least one second character string in association with the network access service in the user device.

9. The method of claim 1, further comprising:
   providing, through a display on the user device, at least one of the network name character string and the password character string for editing; and
   receiving, by the user device, at least one edit that changes at least one character in the at least one of the network name character string and the password character string to provide at least one edited credential.

10. An apparatus comprising a non-transitory, tangible computer-readable storage medium storing a computer program, wherein the computer program has instructions that when executed, carry out:
    detecting a network access service;
    receiving an image from a camera that is included in the apparatus and coupled to the non-transitory, tangible computer readable storage medium, wherein the image received from the camera includes a display of alphanumeric characters that include a network name character string and a password character string, and wherein the display of alphanumeric characters is provided by a service provider that is unaffiliated with the apparatus;
    analyzing the image using optical character recognition and recognizing the network name character string and the password character string in the display of alphanumeric characters that are provided in the image as potential credential information;
    determining that at least one first character string that includes at least one of the network name character string and the password character string of the potential credential information was not accepted by the network access service;
    automatically modifying the at least one first character string to produce at least one second character string that is different from the at least one first character string, wherein the at least one second character string is determined by modifying at least one character in the at least one first character string that was determined using the optical character recognition;
    providing, the at least one second character string to the network access service; and
    accessing a network in response to the at least one second character string being accepted by the network access service.

11. The apparatus of claim 10, wherein the computer program has instructions that when executed, carry out:

prompting for the image that includes the display of alphanumeric characters including the potential credential information.

12. The apparatus of claim 10, wherein the network access service comprises an Internet access service.

13. The apparatus of claim 10, wherein the potential credential information also includes a first descriptive character string portion adjacent the network name character string and a second descriptive character string portion adjacent the password character string.

14. The apparatus of claim 13, wherein the computer program has instructions that when executed, carry out:
    determining that the network name character string is a first functional character string portion associated with the first descriptive character string portion and the password character string is a second functional character string portion associated with the second descriptive character string portion; and
    providing the network name character string and the password character string to the network access service without providing the first descriptive character string portion and the second descriptive character string portion to the network access service.

15. The apparatus of claim 14, wherein the computer program has instructions that when executed, carry out:
    associating the at least one second character string that was accepted by the network access service with the network access service; and
    storing each at least one second character string in association with the network access service in the system.

16. The apparatus of claim 14, wherein the computer program has instructions that when executed, carry out:
    providing at least one of the network name character string and the password character string on a display for editing;
    receiving at least one edit that changes at least one character in the at least one of the network name character string and the password name character string to provide at least one edited.

17. The apparatus of claim 10, wherein the at least one first character string is a single first character string, the at least one second character string is a single second character string, and the computer program has instructions that when executed, carry out:
    automatically modifying the single first character string to produce an intermediate character string; and
    automatically modifying the intermediate character string a plurality of times to produce the single second character string.

18. The apparatus of claim 17, wherein the computer program has instructions that when executed, carry out:
    storing the at least one second password character string.

19. A user device, comprising:
    a chassis that houses a processor;
    a camera housed in the chassis and coupled to the processor;
    a communications device housed in the chassis and coupled to the processor; and
    an optical character recognition engine stored on a non-transitory, tangible computer readable storage medium and configured, following the detection of a network access service, to:
    receive an image that is provided by the camera and that includes a display of alphanumeric characters including a network name character string and a password character string, wherein the display of alphanumeric characters is provided by a service provider that is unaffiliated with the user device;
    analyze the image and recognize the network name character string and the password character string in the display of alphanumeric characters that are provided in the image as potential credential information
    determine that at least one first character string that includes at least one of the network name character string and the password character string of the potential credential information was not accepted by the network access service;
    automatically modify the at least one first character string to produce at least one second character string that is different from the at least one first character string, wherein the at least one second character string is determined by modifying at least one character in the at least one first character string that was determined using the optical character recognition engine;
    provide the at least one functional second character to the network access service; and
    access a network in response to the at least one second character string being accepted by the network access service.

20. The user device of claim 19, further comprising:
    an input device housed in the chassis and coupled to the processor, wherein the input device is free of a physical keyboard having alphanumeric characters.

* * * * *